(12) United States Patent
Hirakawa et al.

(10) Patent No.: US 7,429,416 B2
(45) Date of Patent: Sep. 30, 2008

(54) HONEYCOMB STRUCTURE

(75) Inventors: Toshihiro Hirakawa, Kasugai (JP); Yoshiyuki Kasai, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/727,353

(22) Filed: Mar. 26, 2007

(65) Prior Publication Data

US 2007/0231537 A1  Oct. 4, 2007

(30) Foreign Application Priority Data

Mar. 29, 2006 (JP) .............................. 2006-091936
Feb. 14, 2007 (JP) .............................. 2007-033021

(51) Int. Cl.
B32B 3/12 (2006.01)

(52) U.S. Cl. ........................ 428/116; 428/117

(58) Field of Classification Search ............... 428/116; 246/601, 630; 55/282.3, 523; 422/177, 180
See application file for complete search history.

(56) References Cited

U.S. PATENT DOCUMENTS 7,056,365 B2  6/2006  Ichikawa et al.

2004/0123573 A1*  7/2004  Ichikawa et al. .............. 55/523
2004/0206044 A1*  10/2004  Kondo et al. ................ 52/782.1

FOREIGN PATENT DOCUMENTS

| EP | 0 780 148 A1 | 6/1997 |
| EP | 1 384 507 A2 | 1/2004 |
| JP | A-54110189 | 8/1979 |
| JP | A 2002-326035 | 11/2002 |
| JP | A 2003-181233 | 7/2003 |

* cited by examiner

*Primary Examiner*—Timothy M. Speer
*Assistant Examiner*—Gordon R Baldwin
(74) *Attorney, Agent, or Firm*—Oliff & Berridge, PLC

(57) ABSTRACT

There is disclosed a honeycomb structure which solves a problem of antinomy that it is difficult to satisfy both of a high temperature rise performance and a high thermal capacity at the same time and which is disposed at a previous stage of a filter for trapping particulate matters (PM) discharged from a diesel engine so that regeneration of the PM trapped by the filter can smoothly be completed and an exhaust gas can efficiently be purified. In a honeycomb structure in which a plurality of cells arranged in parallel with one another to communicate between two end surfaces of the honeycomb structure are formed by a plurality of partition walls, the plurality of partition walls are made of a ceramic, and constituted of partition walls having two or more types of thicknesses.

6 Claims, 1 Drawing Sheet

HONEYCOMB STRUCTURE

BACKGROUND OF THE INVENTION

1. Field of the Invention

The present invention relates to a honeycomb structure. The present invention more particularly relates to a honeycomb structure which solves a problem of antinomy that it is difficult to satisfy both of a high temperature rise performance and a high thermal capacity at the same time and which is disposed upstream a filter for trapping particulate matters (PM) discharged from a diesel engine so that regeneration of the PM trapped by the filter can smoothly be completed and an exhaust gas can efficiently be purified.

2. Description of the Related Art

With tightening of regulation of an exhaust gas discharged from a diesel engine, various methods have been proposed in which a diesel particulate filter (DPF) is used in trapping particulate matters (PM) included in the exhaust gas from the diesel engine. In general, a method is adopted in which the DPF is coated with a catalyst that oxidizes the PM, and a honeycomb structure coated with the same catalyst is mounted upstream the DPF. In this honeycomb structure, the PM generated by depositing NO included in the exhaust gas as $NO_2$ on the DPF are burnt. Alternatively, post injection is performed by controlling the engine. A non-burnt fuel is oxidized, an exhaust gas temperature is raised, and the PM deposited on the DPF are burnt and regenerated.

To smoothly burn and regenerate the PM deposited on the DPF, it is necessary to set a time when the catalyst with which the above honeycomb structure is coated reaches an activation temperature to be as long as possible. However, the diesel engine has a low exhaust temperature. Under a small load, the honeycomb structure does not reach the catalyst activation temperature. Even after an operation under a large load, during rapid transfer to the small load, the temperature of the honeycomb structure rapidly drops below the catalyst activation temperature in some case. There have been problems that a burning property of the PM is obstructed and that forced regeneration is not completed.

In view of the above problem, in general, countermeasures such as thinning of cell partition walls of the honeycomb structure and raising of porosity are performed to reduce a thermal capacity of the honeycomb structure and improve a temperature rise characteristic of a substrate. In consequence, the catalyst activation temperature is quickly reached.

When the thermal capacity of the substrate is reduced, the temperature rise characteristic of the substrate is improved, and the coated catalyst can quickly reach the catalyst activation temperature. Conversely, when the exhaust gas temperature drops, the temperature rapidly drops below the catalyst activation temperature. When the exhaust gas temperature drops, to inhibit the temperature drop of the substrate, the thermal capacity of the substrate is increased. In this case, the temperature rise characteristic deteriorates, and there is an antinomic relation between the thermal capacity and the temperature rise characteristic. That is, when the partition wall thickness and porosity of the substrate are simply changed to change the thermal capacity, it is difficult to lengthen a time when the catalyst with which the honeycomb structure is coated reaches the activation temperature.

SUMMARY OF THE INVENTION

The present invention has been developed in view of the above problem, and an object of the present invention is to provide a honeycomb structure which solves a problem of antinomy that it is difficult to satisfy both of a high temperature rise performance and a high thermal capacity at the same time and which is disposed at a previous stage of a filter for trapping particulate matters (PM) discharged from a diesel engine so that regeneration of the PM trapped by the filter can smoothly be completed and an exhaust gas can efficiently be purified.

To achieve the above object, according to the present invention, the following honeycomb structure is provided.

[1] A honeycomb structure comprising: a plurality of partition walls, and a plurality of cells arranged in parallel with one another to communicate between two end surfaces of the honeycomb structure being formed by the plurality of partition walls, wherein the plurality of partition walls are made of a ceramic, and have two or more types of thicknesses.

[2] The honeycomb structure according to the above [1], wherein in a case where the partition walls are cut in a direction vertical to central axes of the cells, the thicknesses of the partition walls are in a constant pattern.

[3] The honeycomb structure according to the above [1] or [2], wherein the partition walls are constituted of two types of partition walls having different thicknesses, and two types of partition walls having the different thicknesses are alternately arranged.

[4] The honeycomb structure according to any one of the above [1] to [3], wherein among the plurality of partition walls, a value of a ratio of the thickness of the partition wall having the maximum thickness to that of the partition wall having the minimum thickness (the thickness of the partition wall having the maximum thickness/the thickness of the partition wall having the minimum thickness) is 1.2 or more and 4.0 or less.

[5] The honeycomb structure according to any one of the above [1] to [4], wherein the partition walls are made of at least one ceramic selected from the group consisting of cordierite, alumina, mullite and lithium aluminosilicate (LAS).

[6] A honeycomb structure coated with a catalyst, constituted by coating the honeycomb structure according to any one of the above [1] to [5] with the catalyst.

[7] A purification device comprising: a filter which traps particulate matters, and the honeycomb structure according to any one of the above [1] to [5], or the honeycomb structure coated with the catalyst according to the above [6], upstream the filter.

According to the present invention, the honeycomb structure is provided which solves a problem of antinomy that it is difficult to satisfy both of a high temperature rise performance and a high thermal capacity at the same time and which is disposed at a previous stage of a filter for trapping particulate matters (PM) discharged from a diesel engine so that regeneration of the PM trapped by the filter can smoothly be completed and an exhaust gas can efficiently be purified.

DESCRIPTION OF THE PREFERRED EMBODIMENT

Figure 1:
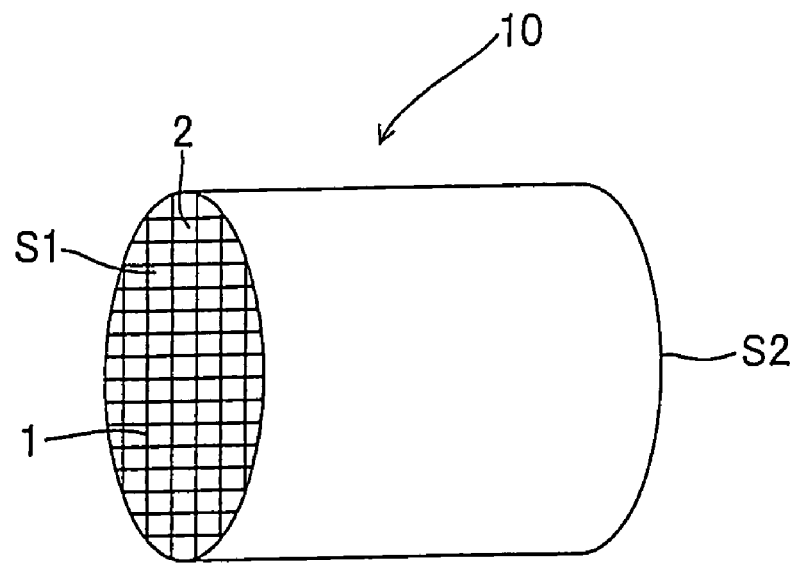
FIG. 1 is a perspective view showing one embodiment of a honeycomb structure according to the present invention.
Figure 2:
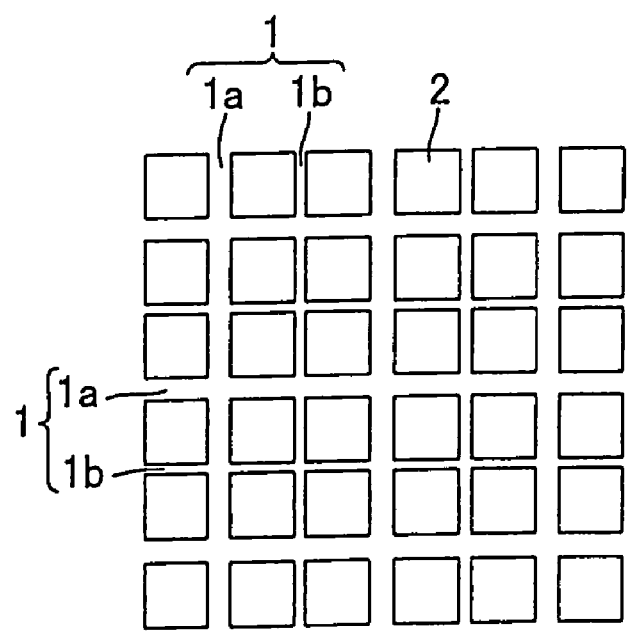
FIG. 2 is an explanatory view showing one end surface of the honeycomb structure shown in FIG. 1.

A best mode for carrying out the present invention will hereinafter be described specifically with reference to the drawings. FIG. 1 is a perspective view showing one embodiment of a honeycomb structure according to the present invention; and FIG. 2 is an explanatory view showing one end surface of the honeycomb structure shown in FIG. 1. As shown in FIG. 1, a honeycomb structure of the present embodiment is a honeycomb structure 10 in which a plurality of cells 2 arranged in parallel with one another to communicate between two end surfaces S1 and S2 of the honeycomb structure are formed by a plurality of partition walls 1. The plurality of walls 1 are made of a ceramic described later, and constituted so as to have two or more types of thicknesses (in FIG. 2, partition walls having a large thickness are denoted with symbol 1a, and partition walls having a small thickness are denoted with 1b). According to such a constitution, during heating, the partition walls 1b having the small thickness are first heated, and a catalyst with which the honeycomb structure is coated quickly reaches an activation temperature thereof. Moreover, when an exhaust gas temperature drops, cooling of the partition walls 1a having the large thickness is delayed, and a time when the catalyst reaches a catalyst activation temperature region can be lengthened.

Moreover, in the present embodiment, as shown in FIG. 2, in a case where the partition walls 1 are cut in a direction vertical to central axes of the cells 2, the thicknesses of the partition walls 1 are constituted in a constant pattern with regularity. According to such a constitution, designing of a honeycomb can be facilitated. Moreover, it is possible to securely exhibit an effect that both of a high temperature rise performance and a high thermal capacity can be satisfied at the same time.

Furthermore, in the present embodiment, as shown in FIG. 2, the partition walls 1 are constituted of two types of partition walls 1a, 1b having different thicknesses, and two types of partition walls 1a, 1b having different thicknesses are scattered and arranged in one carrier. According to such a constitution, it is possible to easily and securely exhibit the effect that both of the high temperature rise performance and the high thermal capacity can be satisfied at the same time.

Furthermore, as shown in FIG. 2, the present embodiment is constituted so that a value of a ratio of the thickness of the partition wall 1a having the maximum thickness to that of the partition wall 1b having the minimum thickness (the thickness of the partition wall 1a having the maximum thickness/ the thickness of the partition wall 1b having the minimum thickness) is 1.2 or more, further preferably 1.6 or more. When the ratio is set to 1.2 or more in this manner, it is possible to easily and securely exhibit the effect that both of the high temperature rise performance and the high thermal capacity can be satisfied at the same time.

However, in the present embodiment, as shown in FIG. 2, if the value of the ratio of the thickness of the partition wall 1a having the maximum thickness to that of the partition wall 1b having the minimum thickness (the thickness of the partition wall 1a having the maximum thickness/the thickness of the partition wall 1b having the minimum thickness) is larger than 4.0, an excessively large partition wall thickness difference is made between a thin wall portion and a thick wall portion, and it is unfavorably difficult to form the honeycomb structure.

In the present embodiment, the partition walls 1 constituting the honeycomb structure 10 are made of at least one ceramic selected from the group consisting of cordierite, alumina, mullite and lithium aluminosilicate (LAS). According to such a constitution, when the partition walls are made of cordierite or the like having a low thermal conductivity, heat spots can be prepared. Since a heated portion has the low thermal conductivity, heat of the portion can be prevented from being transmitted to another portion. Since the catalyst activation temperature is reached, an amount of the heat to be generated by oxidation of an exhaust gas can effectively be used. If the partition walls are made of a metal having a satisfactory thermal conductivity, unlike the present invention, the effect that both of the high temperature rise performance and the high thermal capacity can be satisfied at the same time cannot be expected.

According to the present invention, a honeycomb structure coated with a catalyst is provided which is constituted by coating any of the above honeycomb structures with the catalyst. Here, examples of the catalyst include an oxidation catalyst, an NOx occluding reduction catalyst and an SCR catalyst.

Moreover, according to the present invention, a purification device is provided in which any of the above honeycomb structures or the above honeycomb structure coated with the catalyst is installed at a previous stage of a filter.

EXAMPLES

The present invention will hereinafter be described more specifically in accordance with examples, but the present invention is not limited to these examples.

Example 1

Materials such as talc, kaolin, alumina and silica were mixed at a predetermined mixture ratio so that the materials formed cordierite after fired. A binder, a surfactant and water were added to the materials and mixed at a predetermined mixture ratio to obtain a clay. A particle size, components and the like of a cordierite forming material finally have an influence on porosity and coefficient of thermal expansion, but the material can appropriately be selected by any person skilled in the art. The binder and the surfactant can appropriately be selected. The resultant clay was extruded and formed using an extruder provided with a die having an adjusted slit width in consideration of shrinkages at drying and firing stages so as to obtain a fired cell structure shown in Table 1. The extruded clay was dried and fired to prepare a honeycomb structure having a diameter of 100 mm, a length of 100 mm and substantially square cells.

To measure a temperature of an exhaust gas immediately after the resultant honeycomb structure, an exhaust tube of a gasoline engine having an engine displacement of 2.0 L was subjected to canning, and installed. To obtain a repeated cycle of 200° C. and 400° C. in the engine, an engine load and the number of rotations were adjusted to measure the exhaust gas temperature immediately after the honeycomb structure. Assuming that a honeycomb structure obtained by Comparative Example 1 was a reference, a honeycomb structure having an average exhaust gas temperature rise of 10° C. or more was evaluated as ⊚, a honeycomb structure having an average exhaust gas temperature rise of 3° C. to 10° C. was evaluated as ○, and a honeycomb structure having an average exhaust gas temperature rise which was less than 3° C. was evaluated as X. As shown in Table 1, when the honeycomb structure is constituted of partition walls having a plurality of different thicknesses, the rise of the average exhaust gas temperature can be confirmed. It has also been found that, when a partition wall thickness ratio is set to 1.6 or more, a more effectively result can be obtained.

Examples 2 to 8, Comparative Examples 1 to 5

Honeycomb structures were obtained in the same manner as in Example 1 except that a cell structure of Example 1 was changed as shown in Table 1. Rises of average exhaust gas temperatures are shown in Table 1.

TABLE 1

|  | Partition wall 1a | Partition wall 1b | 1a/1b | No. of cells | Average exhaust gas temperature |
|---|---|---|---|---|---|
| Example 1 | 0.203 | 0.167 | 1.22 | 300 | ○ |
| Example 2 | 0.203 | 0.130 | 1.56 | 300 | ○ |
| Example 3 | 0.203 | 0.125 | 1.62 | 300 | ◎ |
| Example 4 | 0.203 | 0.076 | 2.67 | 300 | ◎ |
| Example 5 | 0.152 | 0.102 | 1.49 | 300 | ○ |
| Example 6 | 0.152 | 0.076 | 2.00 | 300 | ◎ |
| Example 7 | 0.102 | 0.076 | 1.34 | 300 | ○ |
| Example 8 | 0.289 | 0.076 | 3.80 | 300 | ◎ |
| Comparative Example 1 | 0.203 | — | — | 300 | Reference |
| Comparative Example 2 | 0.203 | 0.175 | 1.16 | 300 | X |
| Comparative Example 3 | 0.152 | — | — | 300 | X |
| Comparative Example 4 | 0.152 | 0.140 | 1.09 | 300 | X |
| Comparative Example 5 | 0.102 | — | — | 300 | X |

In Table 1, a unit of the number of cells is cpsi.

A honeycomb structure of the present invention is especially effective for purification of an exhaust gas discharged from a diesel engine having a comparatively low exhaust gas temperature, and can effectively be used as not only a honeycomb structure for a previous stage of a DPF but also a substrate for a selective catalytic reduction (SCR) catalyst for purifying NOx included in the exhaust gas and a diesel oxidation catalyst. The honeycomb structure is also effectively used in treating an exhaust gas discharged from a gasoline engine which discharges the exhaust gas at a comparatively high temperature.

What is claimed is:

1. A honeycomb structure comprising:
    a plurality of partition walls divided into a first set of substantially parallel partition walls and a second set of substantially parallel partition walls, the first set of partition walls and the second set of partition walls being substantially perpendicular to each other, and
    a plurality of cells arranged in parallel with one another to communicate between two end surfaces of the honeycomb structure being formed by the first and second sets of partition walls,
    the plurality of partition walls being made of a ceramic, and having two or more types of thicknesses,
    the plurality of partition walls including a plurality of thick partition walls and a plurality of thin partition walls, the thick partition walls being thicker than the thin partition walls,
    the partition walls of the first set of partition walls being arranged so that each thin partition wall is sequentially next to a thick partition wall and each thick partition wall is sequentially next to a thin partition wall,
    the partition walls of the second set of partition walls being arranged so that each thin partition wall is sequentially next to a thick partition wall and each thick partition wall is sequentially next to a thin partition wall, and
    wherein a value of a ratio of the thickness of any given thin partition wall and any given thick partition wall is between 1.6 and 4.0 inclusive.

2. The honeycomb structure according to claim 1, wherein in a case where the partition walls are cut in a direction vertical to central axes of the cells, the thicknesses of the partition walls are in a constant pattern.

3. The honeycomb structure according to claim 1, wherein the partition walls are made of at least one ceramic selected from the group consisting of cordierite, alumina, mullite and lithium aluminosilicate (LAS).

4. A honeycomb structure coated with a catalyst, constituted by coating the honeycomb structure according to claim 1 with the catalyst.

5. A purification device comprising:
    a filter which traps particulate matters, and
    the honeycomb structure according to claim 1 upstream the filter.

6. A purification device comprising:
    a filter which traps particulate matters, and
    the honeycomb structure according to claim 4 upstream the filter.

* * * * *